J. Sample, Comb'd Seed Planter & Fertilizer Distributor.

No. 119,411. Patented Sep. 26, 1871.

Witnesses:
C. Raettig.
L. S. Mabee

Inventor:
J. Sample
per Munn & Co.
Attorneys.

UNITED STATES PATENT OFFICE.

JOHN SAMPLE, OF FRANKLIN COUNTY, MISSISSIPPI.

IMPROVEMENT IN SEED-PLANTERS AND FERTILIZER-DISTRIBUTERS.

Specification forming part of Letters Patent No. 119,411, dated September 26, 1871; antedated September 23, 1871.

*To all whom it may concern:*

Be it known that I, JOHN SAMPLE, of Franklin county, State of Mississippi, (Summit Post Office,) have invented a new and useful Improvement in Combined Seed-Planter and Fertilizer-Distributer; and I do hereby declare that the following is a full, clear, and exact description thereof, which will enable others skilled in the art to make and use the same, reference being had to the accompanying drawing forming part of this specification.

Figure 1:
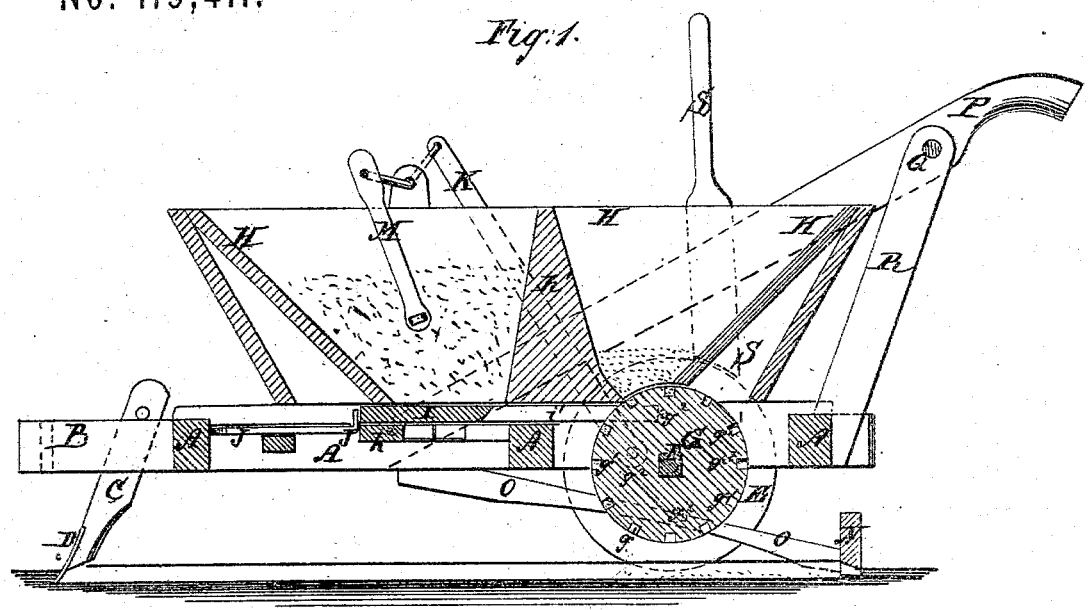
Figure 2:
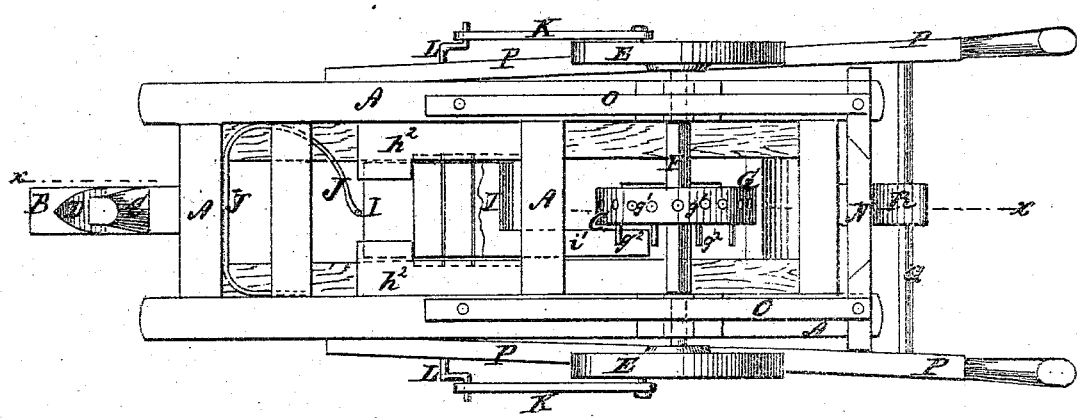

Figure 1 is a vertical longitudinal section of my improved machine taken through the line $x$ $x$, Fig. 2. Fig. 2 is an under-side view of the same.

Similar letters of reference indicate corresponding parts.

My invention has for its object to furnish an improved machine for planting various kinds of seeds and at the same time distributing guano or other fertilizer, and which shall be simple in construction, effective and reliable in operation, and easily adjusted to plant the seeds in drills or in hills at any desired distance apart; and it consists in the construction and combination of the various parts of the machine, as hereinafter more fully described.

A is the frame of the machine, consisting of two long side bars connected by cross-bars. To the center of the forward cross-bar of the frame A is attached the tongue or draft-bar B, to which is attached the upper end of the standard C, to the lower end of which is attached the plow D for opening the furrow to receive the fertilizer and seed. E are the drive-wheels, which are rigidly attached to the ends of the axle F, which revolves in bearings attached to the side bars of the frame A. To the middle part of the axle F is attached a wheel, G, in the face of which is formed a series of holes, $g^1$, to receive the seed from the hopper and convey it to the ground. By leaving all these holes open the seed will be planted in drills, and by filling less or more of said holes the seed may be planted in hills at any desired distance apart, care being taken that the open holes may always be equidistant from each other. To the side of the wheel G are detachably attached a series of pins, $g^2$, to operate the slide for dropping the fertilizer, as hereinafter described. By varying the number of pins $g^2$ the frequency with which the fertilizer is dropped may be regulated at will. H is the hopper, which is divided into two compartments by the cross-partition $h^1$. The front and rear ends of the hopper H are made inclined to cause the seed to settle down toward the discharge-opening in the bottom of said hopper. These inclined ends may be the ends of the hopper, or they may be boards inserted in the end parts of said hopper. The latter construction I prefer, as it gives the hopper a longer base. The rear compartment of the hopper is designed to receive the seed to be planted, and its bottom is slotted to receive the rim of the wheel G, so that the seed may be all the time in contact with and resting upon the said wheel to insure the holes in the wheel being always filled with seed. The bottom of the hopper, just in front of the wheel G, is slightly depressed, and has a tongue formed upon or attached to it to serve as a scraper or guard, to prevent any more seed being carried out by said wheel than the amount contained in its holes $g^1$. The bottom $h^2$ of the forward compartment of the hopper H is cut away, and the upper part of the edges of the cut is beveled off to receive sections or pieces, which may be put in and taken out, according to the character of the fertilizer to be distributed, or to adapt the machine for planting cotton-seed. Upon the bottom $h^2$ of the forward compartment of the hopper H, and through a hole in the forward end of said hopper, works a slide, I, upon the forward end of which is formed, or to it is attached, an arm, $i'$, which projects to the rearward, so as to be struck by the pins $g^2$ of the wheel G, which pins, as the machine is drawn forward, push the slide I back, opening a space between the partition $h^1$ and the rear end of the slide I for the escape of the fertilizer. The rear end of the slide I is beveled off, as shown in Fig. 1, so that as the said slide moves back to its place it may readily pass through the fertilizer to interrupt its outflow and at the same time tend to push the fertilizer downward should it lodge in the discharge-opening. The slide I is pushed back to its place when its arm $i'$ is released from each of the pins $g^2$ by a spring, J, attached to the frame A, and which rests against the forward end of the slide I, as shown in Figs. 1 and 2. When coarse fertilizers are to be distributed the slide I and the detachable sections of the bottom are removed and the device K L M attached to the machine. K are connecting-bars, the lower or rear ends of which are pivoted to crank-pins attached to the drive-wheels E, and the upper or forward ends of which are pivoted to cranks formed upon the ends of the rod L, which work in bearings attached to the sides of the forward compartment of the hopper H. Upon the middle part of the rod L is formed a double crank, upon which is pivoted, and from which is suspended, a bar, M, having a cross-head formed upon or attached to its lower end. By this construction, as the machine is drawn forward the bar M will be forced downward, forcing the coarse fertilizer or cotton-seed out through the bottom of the hopper. N is the coverer, the lower edge of which is concaved to give the desired rounded form to the top of the ridge or row. The coverer N is attached to the rear ends of the spring-bars O, the forward ends of which are secured to the under side of the side bars of the frame A so as to hold the coverer down with sufficient force to cover the seed and at the same time allow the said coverer to yield or rise to pass over obstructions. P are the handles, the forward ends of which are attached to the frame A, and the rear ends of which are supported and held in their proper relative positions by the cross-bar Q, which passes through and is secured to the upper end of the upright R, the lower end of which is attached to the rear cross-bar of the frame A. S is a lever pivoted to one of the handles P, and upon the lower end of which is formed, or to it is attached, a brake-shoe, so that the plowman, by operating the lever S, can readily prevent the revolution of the drive-wheels and the consequent operation of the dropping devices, so as to avoid wasting the seed or fertilizer when turning the machine at the ends of the rows, or when passing around stumps or other obstructions.

Having thus described my invention, I claim as new and desire to secure by Letters Patent—

The combination of the wheels E, dropping-wheels G $g^1$ $g^2$, slide I, bars K, crank-rod L, bar M, and spring J with the seed-hopper and the fertilizer-hopper, substantially as herein shown and described.

JOHN SAMPLE.

Witnesses:
C. W. BEAM, Jr.,
W. T. RAULINS.